United States Patent [19]
White, Jr.

[11] Patent Number: 6,088,676
[45] Date of Patent: *Jul. 11, 2000

[54] SYSTEM AND METHOD FOR TESTING PREDICTION MODELS AND/OR ENTITIES

[75] Inventor: Halbert L. White, Jr., Del Mar, Calif.

[73] Assignee: Quantmetrics R & D Associates, LLC, San Diego, Calif.

[*] Notice: This patent is subject to a terminal disclaimer.

[21] Appl. No.: 09/277,515

[22] Filed: Mar. 26, 1999

Related U.S. Application Data

[63] Continuation of application No. 08/790,716, Jan. 31, 1997, Pat. No. 5,893,069.

[51] Int. Cl.$^7$ .................................................. G06F 17/60
[52] U.S. Cl. ..................... 705/1; 705/7; 705/10
[58] Field of Search ...................... 705/1, 7, 10; 706/58; 707/6, 102

[56] References Cited

U.S. PATENT DOCUMENTS

| | | | |
|---|---|---|---|
| 5,578,923 | 11/1996 | Chen | 324/309 |
| 5,614,718 | 3/1997 | Brace | 250/339 |
| 5,729,465 | 3/1998 | Barbaresco | 702/76 |
| 5,732,358 | 3/1998 | Sawaya et al. | 455/525 |
| 5,774,829 | 6/1998 | Cisneros et al. | 701/213 |

OTHER PUBLICATIONS

Article: The Stationary Bootstrap. Politis and Romano. Journal of the American Statistical Association. vol. 89, No. 428, Theory and Methods, Dec. 1994.

*Primary Examiner*—Eric W. Stamber
*Assistant Examiner*—M. Irshadullah
*Attorney, Agent, or Firm*—John L. Rogitz

[57] ABSTRACT

A computer-implemented performance evaluation method includes specifying a group of comparable entities and a benchmark against which the comparable entities are evaluated. The entities evaluated may be a process, technology, strategy, treatment, organization, individual, or other identifiable unit. A primary data matrix is arranged by data indices, and the primary matrix is sampled with replacement N times to bootstrap N observation matrices. Alternatively, a Monte Carlo approach can be used. Then, all the matrices are filled with measurement criteria, with each criterion being representative of a respective data index and a respective entity. A p-value estimate is returned that measures the statistical significance of the best of the comparable entities relative to the benchmark, where the p-value represents the probability of wrongly rejecting the null hypothesis that a best of the comparable entities has expected performance no better than that of a benchmark. The p-value accounts for the examination of all of the comparable entities, i.e., the p-value depends on the examination of all of the entities as a group, and not simply on a single entity.

18 Claims, 8 Drawing Sheets

Initialize and Execute Bootstrap

Evaluation

SYSTEM AND METHOD FOR TESTING PREDICTION MODELS AND/OR ENTITIES

RELATED APPLICATIONS

The present application is a continuing application of U.S. patent application Ser. No. 08/790,716, filed Jan. 31, 1997, now U.S. Pat. No. 5,893,069, from which priority is claimed, incorporated herein by reference.

FIELD OF THE INVENTION

The present invention relates generally to prediction modeling, and more particularly to systems and methods for testing the effectiveness of prediction models.

BACKGROUND

Prediction models are used to forecast future events on the basis of past performance data. One of the most frequently used and simplest prediction models is one that posits that performance of a given system in the future will resemble performance in the past, apart from random variation. This form of prediction modeling is thus based on past performance evaluation, with the past performance projected into the future. The system that is evaluated may be a process, technology, strategy, treatment, organization or individual, and, for ease of reference, is referred to as an "entity." Examples of such entities, along with the type of entity and criteria that might be used to evaluate the entity, are given as follows:

| ENTITY | TYPE | EVALUATION CRITERION |
|---|---|---|
| Mutual Fund | Organization, Process, or Strategy | % Return, % Return per Unit Risk |
| Athlete | Individual | Batting Avg., ERA |
| Sports Team | Organization | Winning % |
| Airline | Organization | % Return on Stock |
| Pharmaceutical | Treatment | Survival Rate, Remission Rate |
| Chemical Reaction | Process, Technology | Yield Rate |
| Noise Reduction Method | Process, Technology | Gain in Signal-to-Noise |
| Controller | Process, Technology | Tracking Error |
| Stock Portfolio | Process, Strategy | % Return |

The above-referenced patent application recognizes that it is problematic to ascertain whether a successful forecast is due to luck, or due to the effectiveness of the prediction model used to generate the forecast. To address that problem, the above-referenced patent application provides a system for testing the effectiveness of prediction models.

Relatedly, I have further recognized that it is problematic to ascertain whether an apparently good past performance is due to luck, or due to the effectiveness of the entity generating the performance. As an example, if a mutual fund performs well, it might be that the successful performance was a result of investment skill on the part of the fund manager, but it is also possible that the good performance was actually a matter of luck. For example, the fund managers might have switched from stocks to bonds just before a market crash, but for reasons other than their anticipation of the crash. In such a circumstance, the mutual fund is not "good," only lucky.

Nevertheless, it might be evaluated under such circumstances that the performance of the entity is truly good and may be relied upon in the future, based on a lucky outcome. Such lucky outcomes can arise easily when, as is common, a plurality of comparable entities are evaluated for purposes of attempting to find the best of the group compared. This use of the performance data is a form of "data mining." When one engages in such mining there is thus a significant danger that lucky results will be mistaken for good results.

The above-referenced patent application addresses a way to avoid the adverse consequences of so-called data "snooping" by providing an indication of the statistical significance of a prediction model's performance. As recognized herein, it is also possible to avoid the adverse consequences of data mining by providing an indication of the statistical significance of an entity's performance. As further recognized herein, one way to measure the statistical significance of an entity's performance is to compare the entity's performance with the performance of a benchmark, often one that is standard or straightforward. To use the mutual fund analogy, a benchmark against which the performance of various mutual funds might be compared is "always hold the Standard & Poor's 500."

As still further recognized herein, however, it is desirable to understand the statistical significance of performance outcomes vis-á-vis a benchmark performance in the context of more than a single entity, that is, in comparing a group of entities, to avoid the adverse consequences of data mining. That is, the present invention recognizes that it is desirable to generate performance evaluations for each of a group of comparable entities and then determine the statistical significance of the best of the entities relative to the benchmark. Such consideration of the performance of a plurality of entities is called a "group comparison" and is a form of data mining. Stated differently, a statistic that represents the statistical significance of a "best" entity vis-á-vis a benchmark can be misleading, unless a complete group comparison is reflected in the statistic. By accounting for a group comparison in the statistics, incorrectly positive evaluations of the effectiveness of an entity can be avoided.

The present invention accordingly recognizes the need to provide a computer method for evaluating the statistical significance of the best of a plurality of comparable entities, vis-á-vis a benchmark by computing an estimate of a p-value for a test of the formal null hypothesis that a best entity has expected performance no better than that of a benchmark, where the p-value is the probability of wrongly rejecting the null hypothesis on the basis of the evidence provided by the data. Another object of the present invention is to provide a method for performance evaluation in the context of a group of comparable entities. Still another object of the present invention is to provide a method for performance evaluation that is easy to use and cost-effective.

SUMMARY OF THE INVENTION

The invention is a general purpose computer programmed according to the inventive steps herein to evaluate the effectiveness, i.e., predictive ability, of prediction models. The invention can also be embodied as an article of manufacture—a machine component—that is used by a digital processing apparatus and which tangibly embodies a program of instructions that are executable by the digital processing apparatus to evaluate the effectiveness of prediction models. This invention is realized in a critical machine component that causes a digital processing apparatus to perform the inventive method steps herein.

In accordance with the present invention, the method steps include generating the prediction models to be evaluated and generating an effectiveness measurement of a benchmark model using predetermined measurement criteria. The method steps further include generating an effectiveness measurement of each prediction model using the measurement criteria. A statistic is returned that is representative of the statistical significance of the effectiveness of a best one of the prediction models vis-a-vis the benchmark model using the effectiveness measurements, such that the statistic is determined based on the evaluation of all the prediction models.

It will readily be appreciated that with the above disclosure in mind, the present invention transforms data representing discrete performance variables, by a machine through a series of mathematical calculations into a final statistic, thereby producing a useful, concrete, and tangible result—a statistic momentarily fixed for recording and reporting purposes and capable of being relied upon in the subsequent selection of models and/or entities. Accordingly, the present invention produces a useful, concrete and tangible result.

In a preferred embodiment, a primary data matrix includes data grouped by data indices, such as those related to time periods, and the method steps further include defining a predetermined number of observation data matrices by sampling, with replacement, the primary data matrix. The effectiveness measurements of the models are based on the data. For each data matrix, effectiveness measurements of the benchmark model and the prediction models are generated.

Moreover, in the preferred embodiment, for each data matrix, a difference value that represents the difference between a model and a benchmark effectiveness measurement is generated for the respective data matrix. Also, for each matrix an average difference value is generated that represents the average difference between the effectiveness measurements for the respective data matrix. A maximum primary average difference value is determined among the plurality of models based on the primary data matrix. Likewise, an observation maximum average difference value is determined among the plurality of models for each observation data matrix. The observation maximum difference value is a maximum, among the plurality of models, of the difference between the observation average difference value and the primary difference value.

Still further, in the preferred embodiment the observation maximum average difference values are sorted to generate a sorted list. Then, a location in the sorted list is determined for the maximum primary average difference value. Per the preferred embodiment, the location in the sorted list of the maximum primary average difference value is at the $n^{th}$ location in the list, and the statistic that is representative of the statistical significance of the effectiveness of the best among the prediction models is the difference between unity and the ratio of n to the total number of observation matrices.

In another aspect, a computer-implemented method is disclosed for evaluating the effectiveness of the best among plural prediction models against a benchmark model. The method includes specifying the prediction models and defining a primary matrix arranged by data indices. Then, the primary matrix is sampled with replacement N times to define N observation matrices. Next, the matrices are filled with effectiveness measurement criteria, and each criterion represents a respective data index and a respective model. A statistic is returned that represents the statistical significance of the most effective prediction model, based on the matrices.

In still another aspect of the present invention, a computer program product is disclosed which is readable by a digital processing apparatus and which tangibly embodies a computer program. The computer program product combines a computer readable medium with program code elements that measure the effectiveness of a prediction model. In this invention, the code elements are embodied in a program stored on the computer readable medium.

In an alternate embodiment, the invention is a general purpose computer programmed according to the inventive steps herein to evaluate the effectiveness, objectively measured, of an entity such as a process, technology, strategy, treatment, organization, or individual or other identifiable unit or entity. The invention can also be embodied as an article of manufacture-a machine component-that is used by a digital processing apparatus and which tangibly embodies a program of instructions that are executable by the digital processing apparatus to evaluate the performance of each entity in a group of one or more comparable entities. This invention is realized in a critical machine component that causes a digital processing apparatus to perform the inventive method steps herein.

In accordance with the present invention, the method steps include generating an effectiveness measurement of a benchmark entity using predetermined measurement criteria. The method steps further include generating an effectiveness measurement of each entity in a group of comparable entities using the measurement criteria. A statistic is returned that is representative of the statistical significance of the effectiveness of a best one of the group of comparable entities vis-à-vis the benchmark using the effectiveness measurements, such that the statistic is determined based on the evaluation of the entire group of comparable entities.

In a preferred embodiment, a primary data matrix includes data grouped by data indices, such as those related to time periods, and the method steps further include defining a predetermined number of observation data matrices by sampling, with replacement, the primary data matrix. The effectiveness measurements of the entities are based on the data. For each data matrix, effectiveness measurements of the benchmark and the entities are generated.

Moreover, in the preferred embodiment, for each data matrix, a difference value that represents the difference between an entity and a benchmark effectiveness measurement is generated for the respective data matrix. Also, for each matrix an average difference value is generated that represents the average difference between the effectiveness measurements for the respective data matrix. A maximum primary average difference value is determined among the plurality of entities based on the primary data matrix. Likewise, an observation maximum average difference value is determined among the plurality of entities for each observation data matrix. The observation maximum difference value is a maximum, among the plurality of entities, of the difference between the observation average difference value and the primary difference value.

Still further, in the preferred embodiment the observation maximum average difference values are sorted to generate a sorted list. Then, a location in the sorted list is determined for the maximum primary average difference value. Per the preferred embodiment, the location in the sorted list of the maximum primary average difference value is at the $n^{th}$ location in the list, and the statistic that is representative of the statistical significance of the effectiveness of the best among the prediction models is the difference between unity and the ratio of n to the total number of observation matrices.

In another aspect, a computer-implemented method is disclosed for evaluating the effectiveness of the best among plural entities against a benchmark. The method includes specifying the entities to be compared and defining a primary matrix arranged by data indices. Then, the primary matrix is sampled with replacement N times to define N observation matrices. Next, the matrices are filled with effectiveness measurement criteria, and each criterion represents a respective data index and a respective entity. A statistic is returned that represents the statistical significance of the most effective entity, based on the matrices.

In still another aspect of the present invention, a computer program product is disclosed which is readable by a digital processing apparatus and which tangibly embodies a computer program. The computer program product combines a computer readable medium with program code elements that measure the effectiveness of an entity. In this invention, the code elements are embodied in a program stored on the computer readable medium.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

In a first embodiment (FIGS. 1–4), this invention relates to determining the efficacy of prediction models, i.e., to generate a numerical measure (denoted herein as "p") by computing an estimate of the p-value for a test of the formal null hypothesis that a best prediction model has expected performance no better than that of a benchmark, where the p-value is the probability of wrongly rejecting the null hypothesis on the basis of the evidence provided by the data. Thus, the p-value is a measure of the extent to which the performance of a best of a plurality of prediction models relative to a predetermined benchmark is due to luck or is instead due to the true superior effectiveness of the best prediction model.

Figure 1:
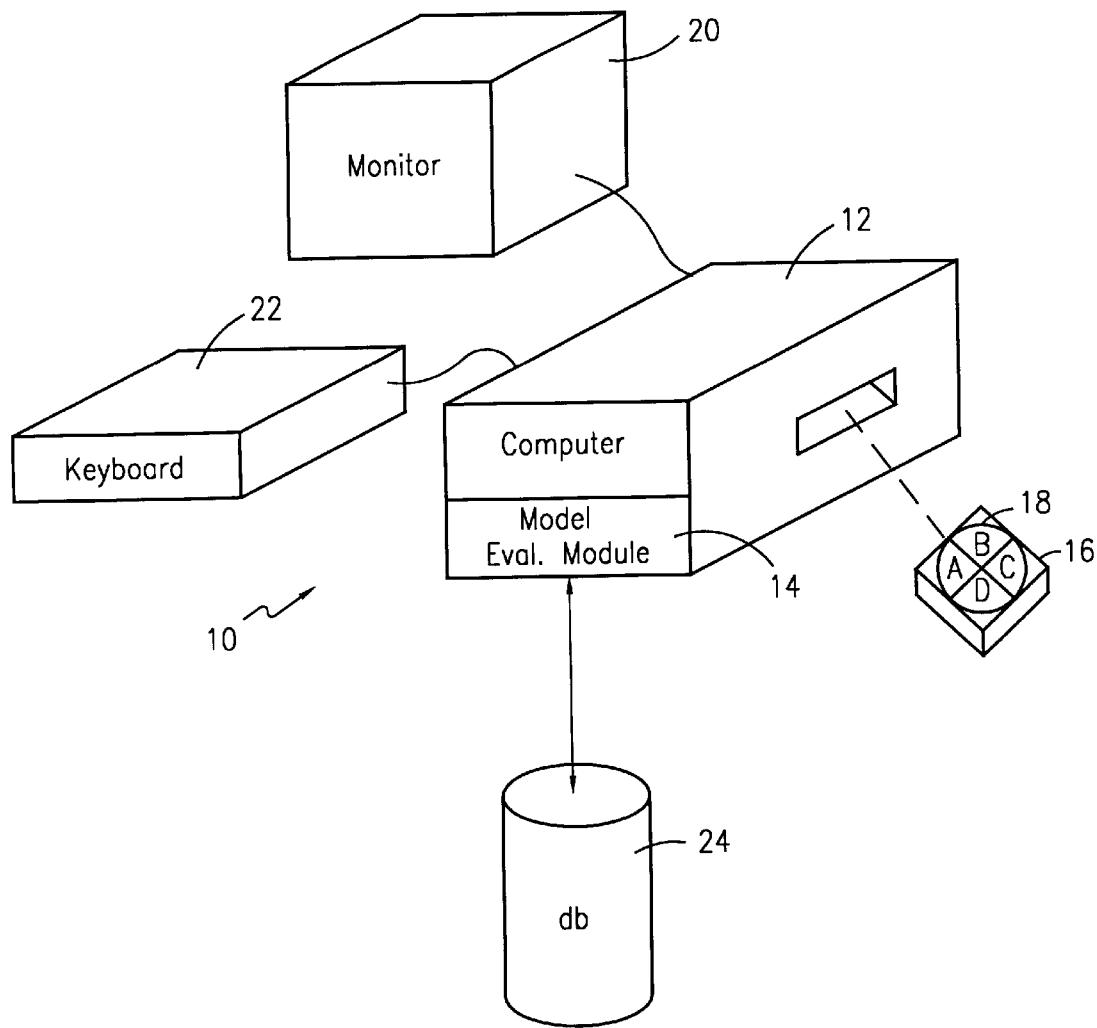
FIG. 1 is a schematic diagram of the performance evaluation system of the present invention.
Figure 5:
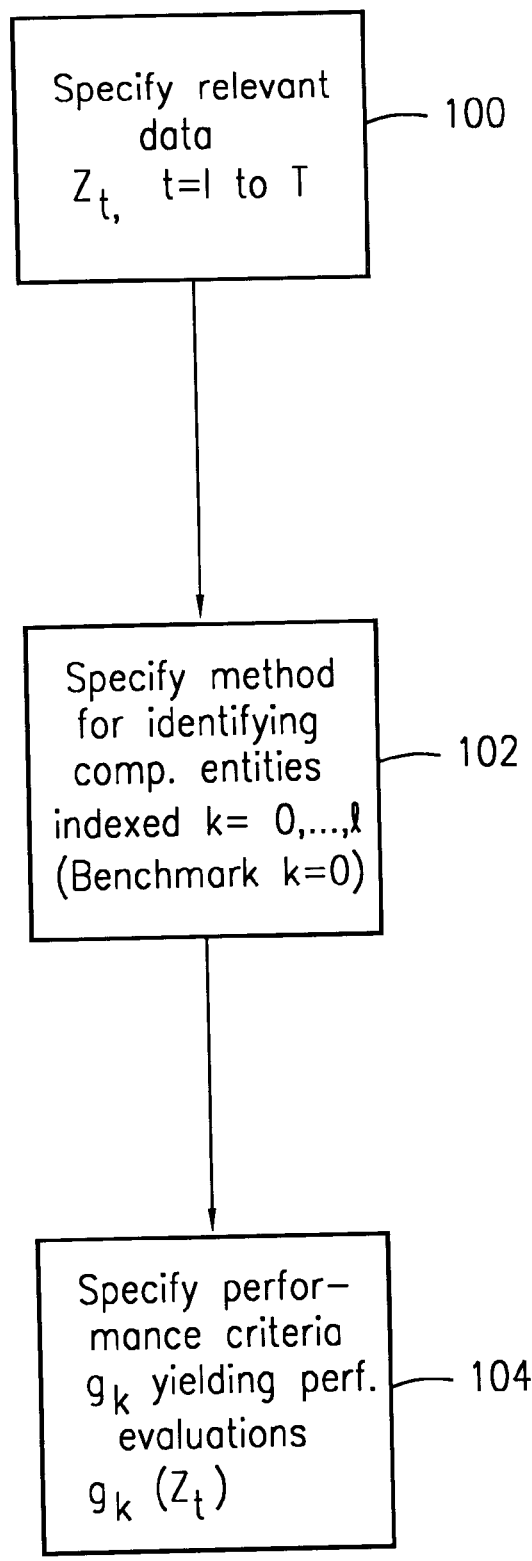
FIG. 5 is a flow chart of the steps for initializing the specifications and estimation measures in determining the efficacy of objectively measurable entities.
Figure 6:
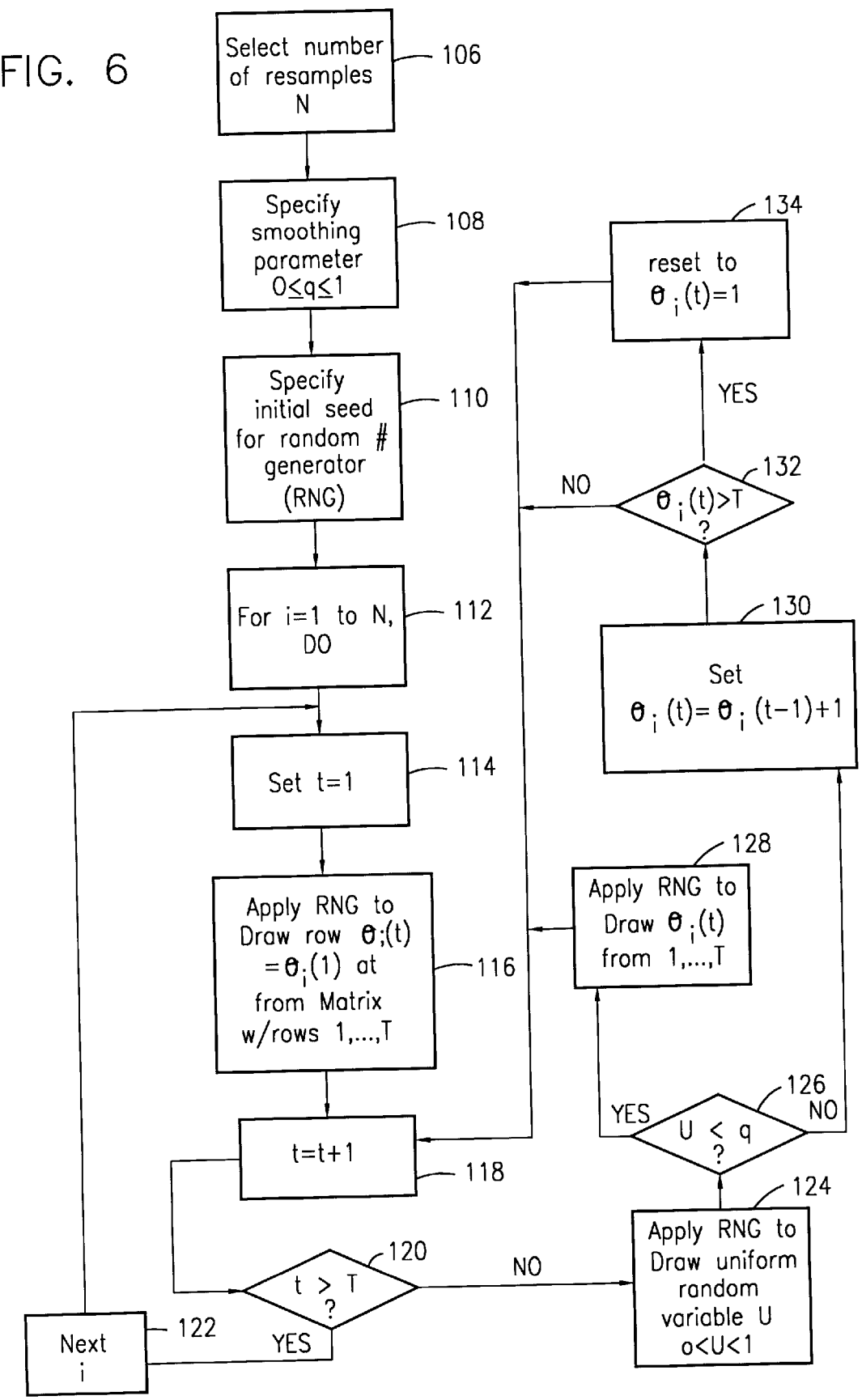
FIG. 6 is a flow chart showing the steps for initializing and executing the "bootstrap" process to sample with replacement the rows of the primary matrix of the logic shown in FIG. 5.
Figure 7:
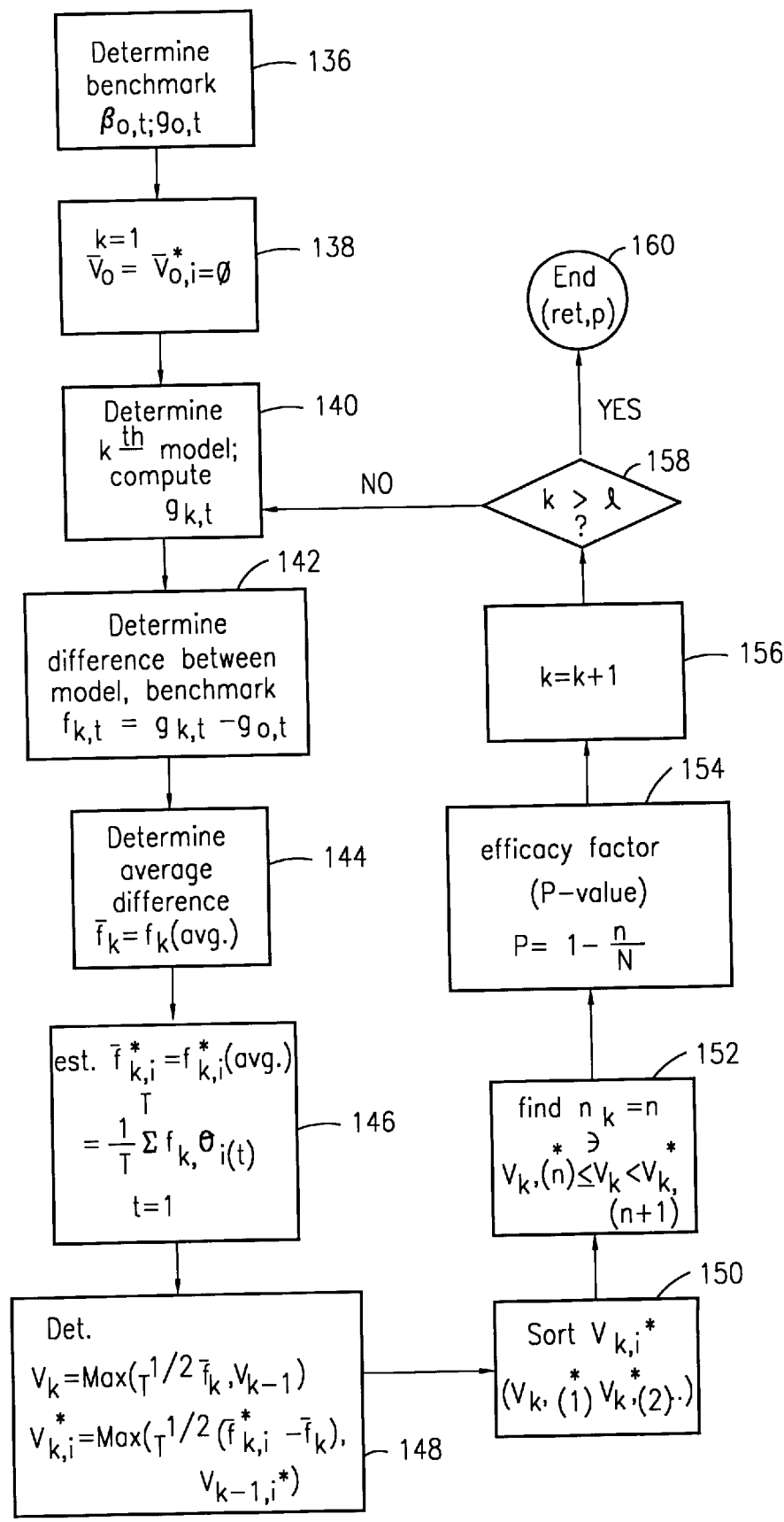
FIG. 7 is a flow chart showing the steps for determining the efficacy value ("p-value") of the best of the comparable entities under test.

In a second embodiment, using the system shown in FIG. 1 and the logic shown in FIGS. 5–7, the invention relates to determining the efficacy of objectively measurable entities, such as a process, technology, strategy, treatment, organization, individual, or other identifiable unit, i.e., to generate a numerical measure (denoted herein as "p") by computing an estimate of the p-value for a test of the formal null hypothesis that a best entity has expected performance no better than that of a benchmark, where the p-value is the probability of wrongly rejecting the null hypothesis on the basis of the evidence provided by the data. Here, the p-value accordingly is a measure of the extent to which the performance of a best of a group of entities relative to a predetermined benchmark is due to luck or is instead due to the true superior effectiveness of the best entity.

Referring initially to FIG. 1, a system for testing or evaluating the effectiveness of prediction models or of objectively measured comparable entities is shown, generally designated 10. In the particular architecture shown, the system 10 includes a digital processing apparatus such as a computer 12. In one intended embodiment, the computer 12 may be a personal computer (PC) computer made by IBM Corp. of Armonk, N.Y., and use an operating system sold under trademarks such as "Windows'." Or, the computer 12 may be a Unix computer, or OS/2 server, or Windows NT server, or IBM RS/6000 250 workstation with 128 MB of main memory running AIX 3.2.5.

As shown, the computer 12 includes an evaluation module 14 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ language code.

The flow charts illustrate the structure of such instructions as embodied in a computer program. Those skilled in the art will appreciate that the Figures illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the figures. The machine component is shown in FIG. 1 as a combination of program code elements A–D in computer readable form that are embodied in a computer-usable data medium 18, on the computer diskette 16. As mentioned above, however, such media can also be found in semiconductor devices, on magnetic tape, and on optical disks.

FIG. 1 shows that the system 10 can include peripheral computer equipment known in the art, including an output device such as a video monitor 20 and an input device such as a computer keyboard 22. Other output devices can be used, such as printers, other computers, and so on. Likewise, input devices other than the keyboard 22 can be used, e.g., trackballs, mice, keypads, touch screens, and voice recognition devices. It is to be understood that the statistics generated herein, as well as the various models and entities that are evaluated as being the "best" (or not) can be output for use on the output devices of the present invention.

Additionally, FIG. 1 shows that the computer 12 accesses a database 24. The database 24 can be internal to the computer 12, or it can be remote from the computer 12.

Figure 2:
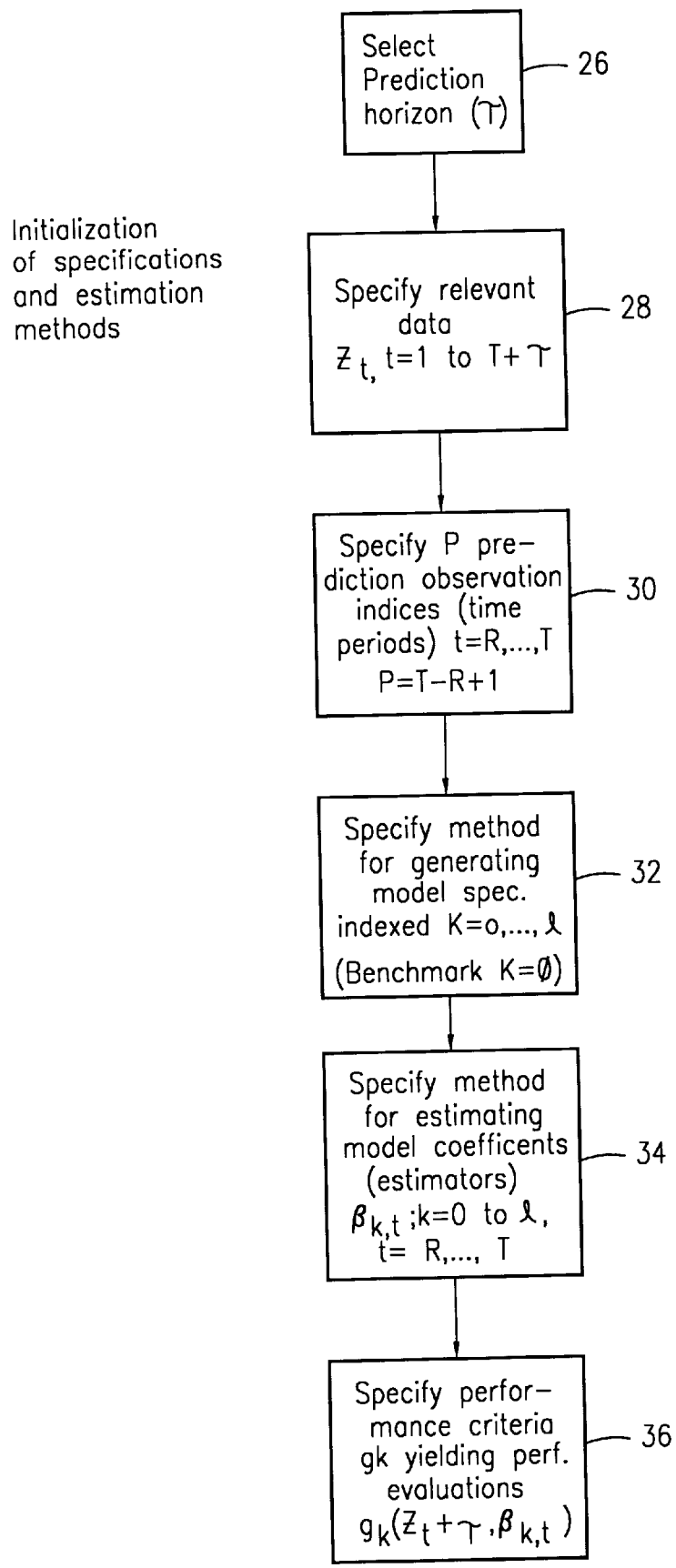
FIG. 2 is a flow chart of the steps for initializing the specifications and estimation measures in evaluating prediction models.

Now referring to FIG. 2, the initialization steps undertaken by the module 14 can be seen. At block 26, a prediction horizon T is specified. The prediction horizon τ is the point in the future, e.g., one day, to which a model prediction pertains and at which it is desired to assess projected model predictions.

Moving to block 28, the relevant data $Z_t$ from the past are specified, wherein t represents a data index, such as a time period from 1 to T+τ. Per the present invention, each data point $Z_t$ is a vector of "dependent" variables (those to be predicted) and "independent" variables (those to be used for prediction). For example, when the prediction models under test are stock market prediction models, the data points $Z_t$ might include stock market returns as a dependent variable and price trends, high/low prices, returns on investment, price per earnings ratio, and so on as independent variables.

At block 30, an integer number P of prediction observation indices are specified. Each index t corresponds to an observed data point (such as a past time period), wherein t=R, ..., T and thus P=T−R+1. As disclosed in detail below with reference to FIG. 4, the data identified at block 28 is associated with its appropriate data index R, ..., T in a primary data matrix. Essentially, the data indices R, ..., T define respective matrix row indices.

The process then moves to block 32, wherein a method is specified for generating model specifications indexed by model indices k, wherein k is an integer=0, ..., l. In other words, at block 32, a method is specified for generating "l" prediction models.

As an example, it might be desirable to determine whether stock returns in excess of an average is forecastable. In this example, the integer P represents the number of previous trading periods, e.g., days, for which predictions are to be evaluated. The process at block 32 in the present example would specify that, e.g., a set of linear forecasting models are to be generated, each of which models considers certain technical indicators regarding stock prices. Examples of such indicators include lagged returns, local trend measures, relative strength indices, and moving average oscillators. In one instance, it might be desirable that each model consider three indicators out of, as an example, twenty-nine. With the numbers in this example, 3,654 models would be generated (i.e., l=3,654).

Next, at block 34, a method is specified for estimating a set of model coefficients, i.e., estimators of model coefficients, denoted herein as $\beta_{k,t}$. As an example, it might be specified at block 34 that the estimators $\beta_{k,t}$ are to be determined using ordinary least squares (OLS) or recursive least squares for each of the P periods.

For the benchmark model, the model index k=0. As an example, the benchmark model may contain only a constant. Thus, the skilled artisan will recognize that the "null" hypothesis implied in the example discussed herein is, "excess stock market returns are simply a martingale difference sequence, and therefore are not forecastable". For a prediction model to be statistically significant, it must strongly suggest that the null hypothesis is wrong by "beating" the benchmark model and having a correspondingly low p-value.

From block 34, the process moves to block 36 to specify what criteria $g_k$ (a function) will be used for evaluating model performance as $g_k(Z_{t+\tau}, \beta_{k,t})$. Continuing with the present example, the performance criteria specified at block 36 might be accuracy of stock forecast using a negative squared error of prediction, or returns on investment, and so on. By convention, a greater value of $g_k(Z_{t+\tau}, \beta_{k,t})$ will be taken to be indicative of better performance.

Figure 3:
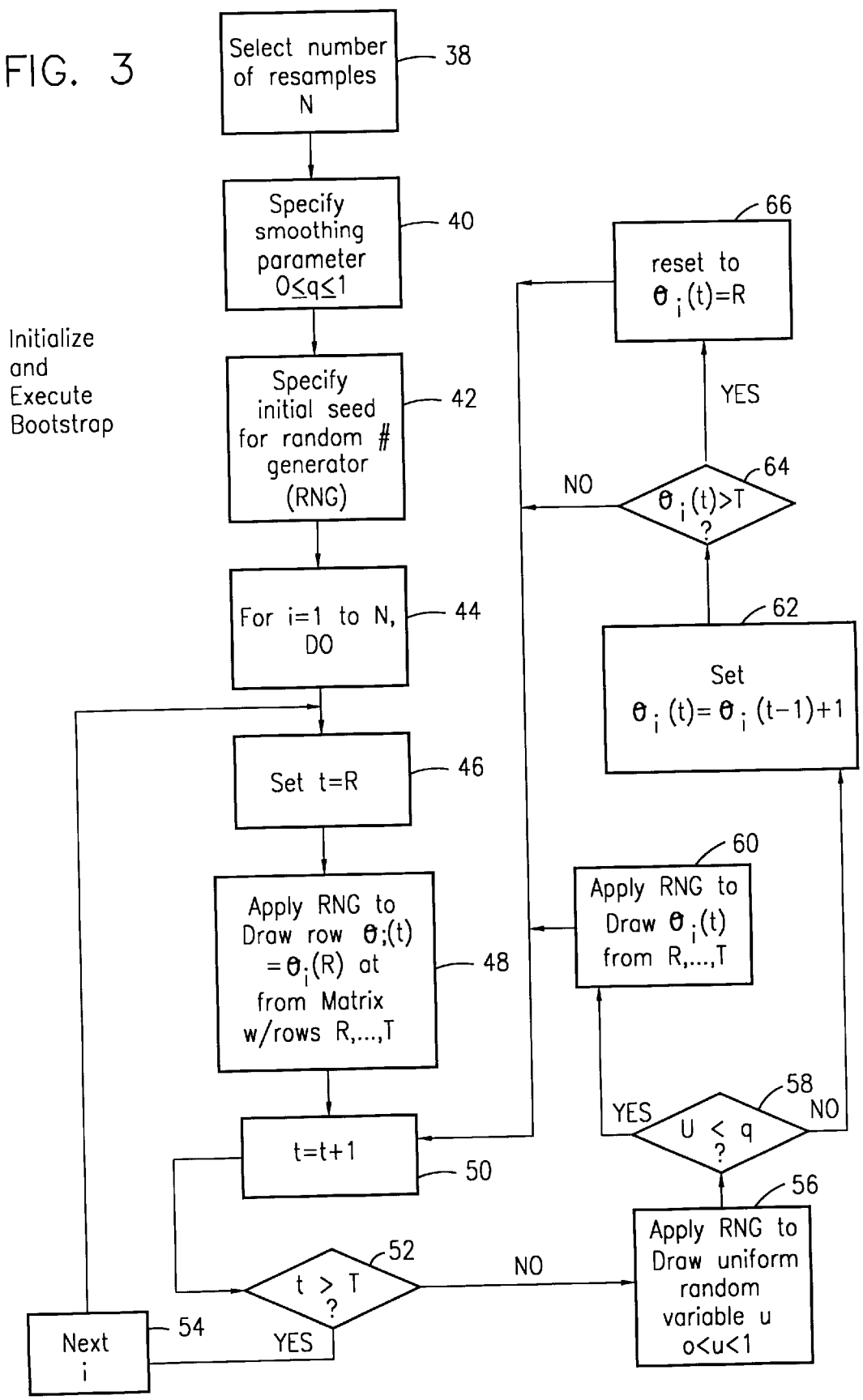
FIG. 3 is a flow chart showing the steps for initializing and executing the "bootstrap" process to sample with replacement the rows of the primary matrix.

Referring now to FIG. 3, the method used to define resamples of the relevant data, referred to herein as a "bootstrap" method, is shown. In accordance with the present invention, plural resamples of the primary data matrix are first defined in FIG. 3 and then generated in FIG. 4 to facilitate the process discussed below in reference to FIG. 4, to thereby enable undertaking the present method without resort to a Monte Carlo simulation. Nevertheless, as disclosed below in reference to FIG. 8, a Monte Carlo simulation can indeed be used if desired.

Commencing at block 38, the number N of data resamples is specified. For example, the number N of data resamples might be one thousand. As discussed more fully below, after the process discussed herein the primary data matrix will be associated with N observation matrices.

Next, at block 40, a smoothing parameter q, $0 \leq q \leq 1$, is specified. In accordance with the present invention, the value of the smoothing parameter q is selected based on the statistical dependence of the relevant data. When the relevant data is statistically independent, the value of the smoothing parameter q is one. In the illustrative example discussed herein, the value of the smoothing parameter q is 0.5. From block 40, the process moves to block 42 to define the random number generator seed value.

Once the bootstrap process has been initialized at blocks 38–42, the process moves to block 44 to enter a "DO" loop using a resample counter variable i to define N resamples of the data. Each resample can be regarded as an observation matrix in which each row represents data gathered for a particular one of the P data indices. Essentially, the process below defines the resamples by sampling, with replacement, the primary data matrix defined in FIG. 2. Then, using the process discussed below in reference to FIG. 4, the primary and observation data matrices are filled with the data specified above during the process shown in FIG. 2.

At block 46, an index variable t is set equal to the first data index R for which prediction data are to be evaluated. Then, at block 48 a row $\theta_i(t)$ (also referred to as an "observation index") of the $i^{th}$ observation matrix is defined to be the row $\theta_i(R)$ by drawing a row index uniformly and at random from the row indices R, ..., T of the primary data matrix. Next, at block 50 the index variable t is incremented by one, and then the process moves to decision diamond 52 to determine whether the index variable t is greater than the value of the last row T of the primary data matrix. If it is, the process moves to block 54 to retrieve the next value for the counter variable i, and then loops back to block 46.

On the other hand, if, at decision diamond 52, it is determined that the index variable t is not greater than the last row T of the primary data matrix, the process moves to block 56 to draw a uniform random variable U independently of all other random variables. The value of the uniform random variable U is between zero (0) and one (1).

Moving to decision diamond 58, it is determined whether the value of the uniform random variable U is less than the value of the smoothing parameter q. If it is, the logic moves to block 60 to define another observation index $\theta_i(t)$ by drawing a row index uniformly and at random from the row indices R, ..., T of the primary data matrix. From block 60, FIG. 3 shows that the logic loops back to block 50.

In contrast, if the value of the uniform random variable U is not less than the value of the smoothing parameter q, the process moves from decision diamond 58 to block 62 to define the present observation index $\theta_i(t)$ to be one greater than the previous observation index $\theta_i(t-1)$. Moving to decision diamond 64, it is determined whether the present observation index $\theta_i(t)$ is greater than the last row index T. If not, the process loops back to block 50, but otherwise resets the present observation index $\theta_i(t)$ to the first row index R, prior to looping back to block 50.

Figure 4:
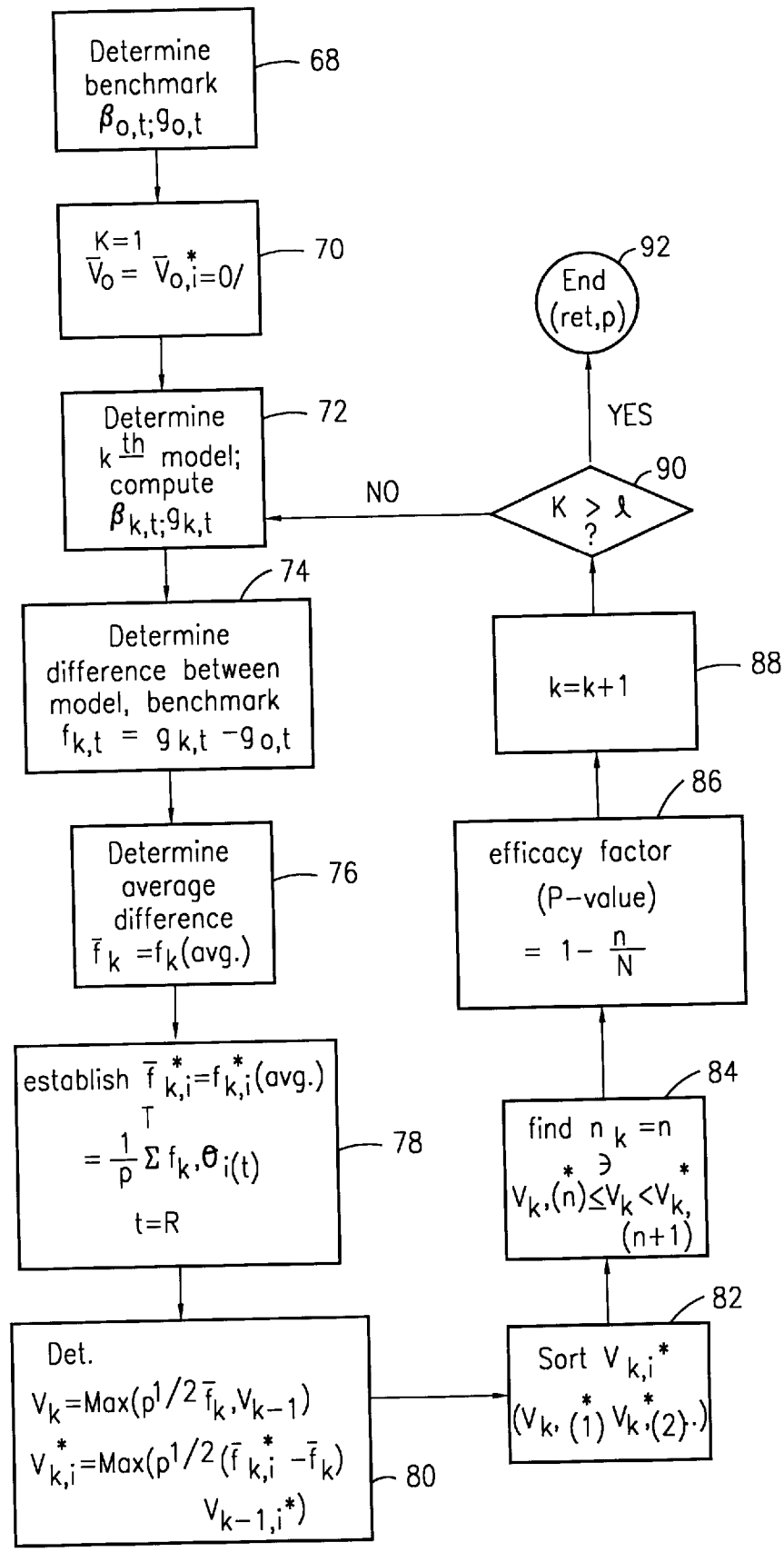
FIG. 4 is a flow chart showing the steps for determining the efficacy value ("p-value") of the best of the prediction models under test.

After all N observations matrices have been defined by the process shown in FIG. 3, the logic moves to the process shown in FIG. 4 to fill the matrices and then to evaluate the statistical significance of the best one of the prediction models vis-a-vis the benchmark model. Using the specifications defined in FIG. 2, at block 68 the logic determines the coefficients $\beta_{0,t}$ and performance criteria $g_{0,t}=g_0(Z_{t+\tau}, \beta_{0,t})$, t=R, . . . ,T to be used for the benchmark model. Recall that the benchmark model index value for the model index variable k is zero (0). Accordingly, the performance criteria $g_0(Z_{t+\tau}, \beta_{0,t})$ are inserted into the first column of the primary data matrix as the benchmark criteria.

Next, at block 70 the model index variable k is set equal to one. Also at block 70 an initial maximum primary average difference value $V_0$ and an initial observation maximum average difference value $V_{0,i}^*$, i=1, . . . ,N are set equal to zero. Then, at block 72 the coefficients $\beta_{k,t}$ and performance criteria $g_k(Z_{t+\tau}, \beta_{k,t})$, t=R, . . . ,T are computed using the specifications defined in FIG. 2. Per the present invention, the performance criteria $g_{k,t}=g_k(Z_{t+\tau}, \beta_{k,t})$ are inserted into the second column of the primary data matrix. As the skilled artisan will recognize, the performance criteria $g_{k,t}$ represent effectiveness measurements for the $k^{th}$ model.

Moving to block 74 from block 72, the logic of the present invention determines a performance difference value $f_{k,t}=g_{k,t}-g_{0,t}$ for each row of the first two columns of the primary matrix, i.e., the difference between the $k^{th}$ model criteria and the benchmark model criteria for each of the P indices. This performance difference is inserted into the third column of the primary matrix. The performance difference is then averaged at block 76 to yield an average performance difference value $f_k(avg.)=(1/P)\Sigma f_{k,t}$, the sum being taken over t=R to T.

After having generated the primary data matrix as described above, the present invention moves to block 78 to generate the previously-defined N observation matrices, indexed by the resample counter variable i, as follows. For each observation matrix, i=1 to N, an average performance difference value $f_{k,i}^*(avg.)$ is determined by computing $(1/P)\Sigma f_{k,\theta i(t)}$, the sum being taken over t=R to T for each $i^{th}$ observation matrix.

After the N observation matrices have been generated at block 78, the logic moves to block 80 to determine, for the $k^{th}$ model under test, the maximum primary average difference value $V_k$ using the primary matrix and, for each of the observation matrices, the observation maximum average difference value $V_{k,i}^*$, as follows:

$V_k$=maximum of $P^{1/2}f_k(avg.)$, $V_{k-1}$; and $V_{k,i}^*$=maximum of $P^{1/2}(f_{k,i}^*(avg.)-f_k(avg.))$, $V_{k-1,i}^*$.

Thus, the observation maximum average difference value $V_{k,i}^*$ is a maximum among the prediction models of the difference between the observation matrix average difference value and the primary matrix difference value.

From block 80, the present invention moves to block 82 to sort the observation maximum average difference values $V_{k,i}^*$, from smallest to largest, to generate a sorted list. The sorted values are then denoted $V_{k,(1)}^*$, $V_{k,(2)}^*$, . . . Then, at block 84 the location in the sorted list is determined for the maximum primary average difference value $V_k$. Specifically, an $n_k$ that equals n is determined such that $V_{k,(n)}^* \leq V_k < V_{k,(n+1)}^*$.

Moving to block 86, an efficacy factor p, which is a statistic that represents the statistical significance of the effectiveness of the best among the k prediction models relative to the benchmark, is determined. As intended by the present invention, the efficacy factor p is the difference between unity and the ratio of n to the total number of observation matrices. As the skilled artisan will recognize, the efficacy factor p is an estimate of a "p-value" associated with a statistical test of a formal hypothesis that a best prediction model has expected performance no better than that of a benchmark. The efficacy factor varies between zero and one; the more statistically significant the "best" model vis-a-vis the benchmark, the lower the p-value.

The logic then moves to block 88 to increment k by one, and then tests whether the last model has been evaluated at decision diamond 90. If not, the logic loops back to block 72. Otherwise, the model ends at state 92 and returns the final value of the efficacy factor p.

With the above disclosure in mind, it can now be appreciated that the efficacy factor p is determined based on the evaluation of all the prediction models. In other words, the final value for the efficacy factor p depends on the evaluation of all of the l prediction models collectively, and it represents the statistical significance of the best model among them, vis-a-vis the benchmark model. If a best model is indicated as being statistically significant (a low p-value), it can subsequently be used using the system of FIG. 1 to predict performance. In contrast, if a best model is indicated as not being statistically significant (a high p-value) one can use the benchmark model using the system of FIG. 1 to predict performance; alternatively, one can proceed to evaluate additional prediction models not previously considered, using the present invention in a continued attempt to discover a statistically significant performance relative to the benchmark.

Now referring to FIG. 5, an alternate embodiment of the invention, in which the effectiveness of entities is determined, is shown. The initialization steps undertaken by the module 14 for this alternate embodiment can be seen. At block 100, the relevant data $Z_1$ from the past is specified, wherein t represents a data index, such as a time period from 1 to T. Per the present invention, each data point $Z_t$ is a vector of variables to be used in constructing a measure of performance effectiveness. For example, when the entities under evaluation are mutual funds, the data points $Z_t$ might include mutual fund daily returns as variables.

Each index t corresponds to an observed data point (such as a past time period), wherein t=1, . . . ,T. As disclosed in detail below with reference to FIG. 6, the data identified at block 100 is associated with its appropriate data index 1, . . . ,T in a primary data matrix. Essentially, the data indices 1, . . . ,T define respective matrix row indices.

The process then moves to block 102, wherein a method is specified for identifying the entities to be compared, indexed by entity indices k, wherein k is an integer=0, . . . , l. In other words, at block 102, a method is specified for identifying "l" comparable entities.

At block 104, the logic specifies what criterion $g_k$ (a function) will be used for evaluating performance as $g_k(Z_t)$, where k=0,1, . . . , l is the index of the entities evaluated. By convention, a greater value of $g_k(Z_t)$ will be taken to be indicative of better performance. Continuing with the mutual fund example, the performance criteria specified at block 104 might be returns on investment, or return per unit risk, and so on.

For the benchmark, the index k=0. For the mutual fund example, the benchmark may be the investment strategy "buy and hold the Standard & Poor's 500". Thus, the skilled artisan will recognize that the "null" hypothesis implied in the example discussed herein is, "expected mutual fund returns for the best performing fund are no better than the expected returns from holding the Standard & Poor's 500". For a best mutual fund performance to be statistically significant, it must strongly suggest that the null hypothesis is wrong by "beating" the benchmark and having a correspondingly low p-value.

Referring now to FIG. 6, the method used to define resamples of the relevant data, referred to herein as a "bootstrap" method, is shown. In accordance with the present invention, plural resamples of the primary data matrix are first defined in FIG. 6 and then generated in FIG. 7 to facilitate the process discussed below in reference to FIG. 7.

Commencing at block 106, the number N of data resamples is specified. For example, the number N of data resamples might be one thousand. As discussed more fully below, after the process discussed herein the primary data matrix will be associated with N observation matrices.

Next, at block 108, a smoothing parameter q, $0 \leq q \leq 1$, is specified. In accordance with the present invention, the value of the smoothing parameter q is selected based on the statistical dependence of the relevant data. When the relevant data are statistically independent, the value of the smoothing parameter q is one. In the illustrative example discussed herein, the value of the smoothing parameter q is 0.5. From block 108, the process moves to block 110 to define the random number generator seed value.

Once the bootstrap process has been initialized, the process moves to block 112 to enter a "DO" loop using a resample counter variable i to define N resamples of the data. Each resample can be regarded as an observation matrix in which each row represents data gathered for a particular one of the T data indices. Essentially, the process below defines the resamples by sampling, with replacement, the primary data matrix defined herein. Then, using the process discussed below in reference to FIG. 7, the primary and observation data matrices are filled with the data specified above during the process shown in FIG. 6.

At block 114, an index variable t is set equal to the first data index "1" for which performance data are to be evaluated. Then, at block 116 a row $\theta_i(t)$ (also referred to as an "observation index") of the $i^{th}$ observation matrix is defined to be the row $\theta_i(1)$ by drawing a row index uniformly and at random from the row indices $1, \ldots, T$ of the primary data matrix. Next, at block 118 the index variable "t" is incremented by one, and then the process moves to decision diamond 120 to determine whether the index variable t is greater than the value of the last row T of the primary data matrix. If it is, the process moves to block 122 to retrieve the next value for the counter variable "i", and then the logic loops back to block 114.

On the other hand, if, at decision diamond 120, it is determined that the index variable "t" is not greater than the last row T of the primary data matrix, the process moves to block 124 to draw a uniform random variable U independently of all other random variables. The value of the uniform random variable U is between zero (0) and one (1).

Moving to decision diamond 126, it is determined whether the value of the uniform random variable U is less than the value of the smoothing parameter q. If it is, the logic moves to block 128 to define another observation index $\theta_i(t)$ by drawing a row index uniformly and at random from the row indices $1, \ldots T$ of the primary data matrix. From block 128, FIG. 6 shows that the logic loops back to block 118.

In contrast, if the value of the uniform random variable U is not less than the value of the smoothing parameter q, the process moves from decision diamond 126 to block 130 to define the present observation index $\theta_i(t)$ to be one greater than the previous observation index $\theta_i(t-1)$. Moving to decision diamond 132, it is determined whether the present observation index $\theta_i(t)$ is greater than the last row index T. If not, the process loops back to block 118, but otherwise the logic resets the present observation index $\theta_i(t)$ to the first row index 1 at block 134, prior to looping back to block 118.

After all N observations matrices have been defined by the process shown in FIG. 6, the logic moves to the process shown in FIG. 7 to fill the matrices and then to evaluate the statistical significance of the best one of the entities evaluated vis-á-vis the benchmark. Using the specifications defined in FIG. 5, at block 136 the logic determines the performance criteria $g_{0,t}=g_0(Z_t), t=1, \ldots, T$ to be used for the benchmark. Recall that the benchmark index value for the index variable k is zero (0). Accordingly, the performance criteria $g_0(Z_t)$ are inserted into the first column of the primary data matrix as the benchmark criteria.

Next, at block 138 the entity index variable k is set equal to one. Also at block 138 an initial maximum primary average difference value $V_0$ and an initial observation maximum average difference value $V_{0,i}^*$, $i=1, \ldots, N$ are set equal to zero. Then, at block 140 the performance criteria $g_k(Z_t)$, $t=1, \ldots, T$ are computed using the specifications defined in FIG. 5. Per the present invention, the performance criteria $g_{k,t}=g_k(Z_t)$ are inserted into the second column of the primary data matrix. As the skilled artisan will recognize, the performance criteria $g_{k,t}$ represent effectiveness measurements for the $k^{th}$ entity.

Moving to block 142 from block 140, the logic of the present invention determines a performance difference value $f_{k,t}=g_{k,t}-g_{0,t}$ for each row of the first two columns of the primary matrix, i.e., the difference between the $k^{th}$ entity's performance criterion and the benchmark criterion for each of the T indices. This performance difference is inserted into the third column of the primary matrix. The performance difference is then averaged at block 144 to yield an average performance difference value $f_k(\text{avg.})=(1/T)\Sigma f_{k,t}$, the sum being taken over t=1 to T.

After having generated the primary data matrix as described above, the present invention moves to block 146 to generate the previously-defined N observation matrices, indexed by the resample counter variable i, as follows. For each observation matrix, i=1 to N, an average performance difference value $f_{k,i}^*(\text{avg.})$ is determined by computing $(1/T)\Sigma f_{k,\theta i(t)}$, the sum being taken over t=1 to T for each $i^{th}$ observation matrix.

After the N observation matrices have been generated at block 146, the logic moves to block 148 to determine, for the $k^{th}$ entity under test, the maximum primary average difference value $V_k$ using the primary matrix and, for each of the observation matrices, the observation maximum average difference value $V_{k,i}^*$, as follows:

$V_k$=maximum of $T^{1/2}f_k(\text{avg.}), V_{k-1}$; and $V_{k,i}^*$=maximum of $T^{1/2}(f_{k,i}^*(\text{avg.})-f_k(\text{avg.})), V_{k-1,i}^*$.

Thus, the observation maximum average difference value $V_{k,i}^*$ is a maximum among the entities of the difference between the observation matrix average difference value and the primary matrix difference value.

From block 148, the present invention moves to block 150 to sort the observation maximum average difference values $V_{k,i}^*$, from smallest to largest, to generate a sorted list. The sorted values are then denoted $V_{k,(1)}^*, V_{k,(2)}^*, \ldots$. Then, at block 152 the location in the sorted list is determined for the maximum primary average difference value $V_k$. Specifically, an $n_k$ that equals n is determined such that $V_{k,(n)}^* \leq V_k < V_{k,(n+1)}^*$.

Moving to block 154, an efficacy factor p, which is a statistic that represents the statistical significance of the effectiveness of the best among the k entities evaluated relative to the benchmark, is determined. As intended by the present invention, the efficacy factor p is the difference between unity and the ratio of n to the total number N of observation matrices. As the skilled artisan will recognize, the efficacy factor p is an estimate of a "p-value" associated with a statistical test of a formal hypothesis that a best entity, such as a process, technology, strategy, treatment, organization, individual or other identifiable unit has expected performance no better than that of a benchmark. The efficacy factor varies between zero and one; the more statistically significant the "best" entity vis-à-vis the benchmark, the lower the p- value.

The logic then moves to block 156 to increment k by one, and then tests whether the last entity has been evaluated at decision diamond 158. If not, the logic loops back to block 140. Otherwise, the logic ends at state 160 and returns the final value of the efficacy factor p.

With the above disclosure in mind, it can now be appreciated that the efficacy factor p is determined based on the evaluation of all the comparable entities. In other words, the final value for the efficacy factor p depends on the evaluation of all of the comparable entities collectively, and it represents the statistical significance of the best among them, vis-à-vis the benchmark.

If a best entity is indicated as being statistically significant by virtue of a low p-value, it can subsequently be selected or used. For example, if a best performing mutual fund is indicated as being statistically significant relative to the benchmark "buy and hold the Standard & Poor's 500", then one can invest in the best performing mutual fund. In contrast, if a best entity is indicated as not being statistically significant by virtue of a large p-value, one can subsequently select or use the benchmark; alternatively, one can proceed to evaluate additional entities not previously considered, using the present invention in a continued attempt to discover a statistically significant performance relative to the benchmark. For example, if a best performing mutual fund is indicated as not being statistically significant relative to the benchmark "buy and hold the Standard & Poor's 500", then one can invest in the Standard & Poor's 500; alternatively, one can proceed to evaluate additional mutual funds not previously considered, using the present invention in a continued attempt to discover a mutual fund with statistically significant performance relative to the benchmark "buy and hold the Standard & Poor's 500".

FIGS. 3 and 6 above showed that the present process can initialize using the bootstrap process shown herein. Alternatively, taking the process shown in FIGS. 2–4 as an example, it being understood that the following discussion applies equally to the process shown in FIGS. 5–7, the initialization logic of FIG. 2 can be executed, and the logic of FIG. 3 omitted. The logic of FIG. 4 under such circumstances is modified to the logic shown in FIG. 8, which uses a Monte Carlo process in lieu of the above-described bootstrap process.

Figure 8:
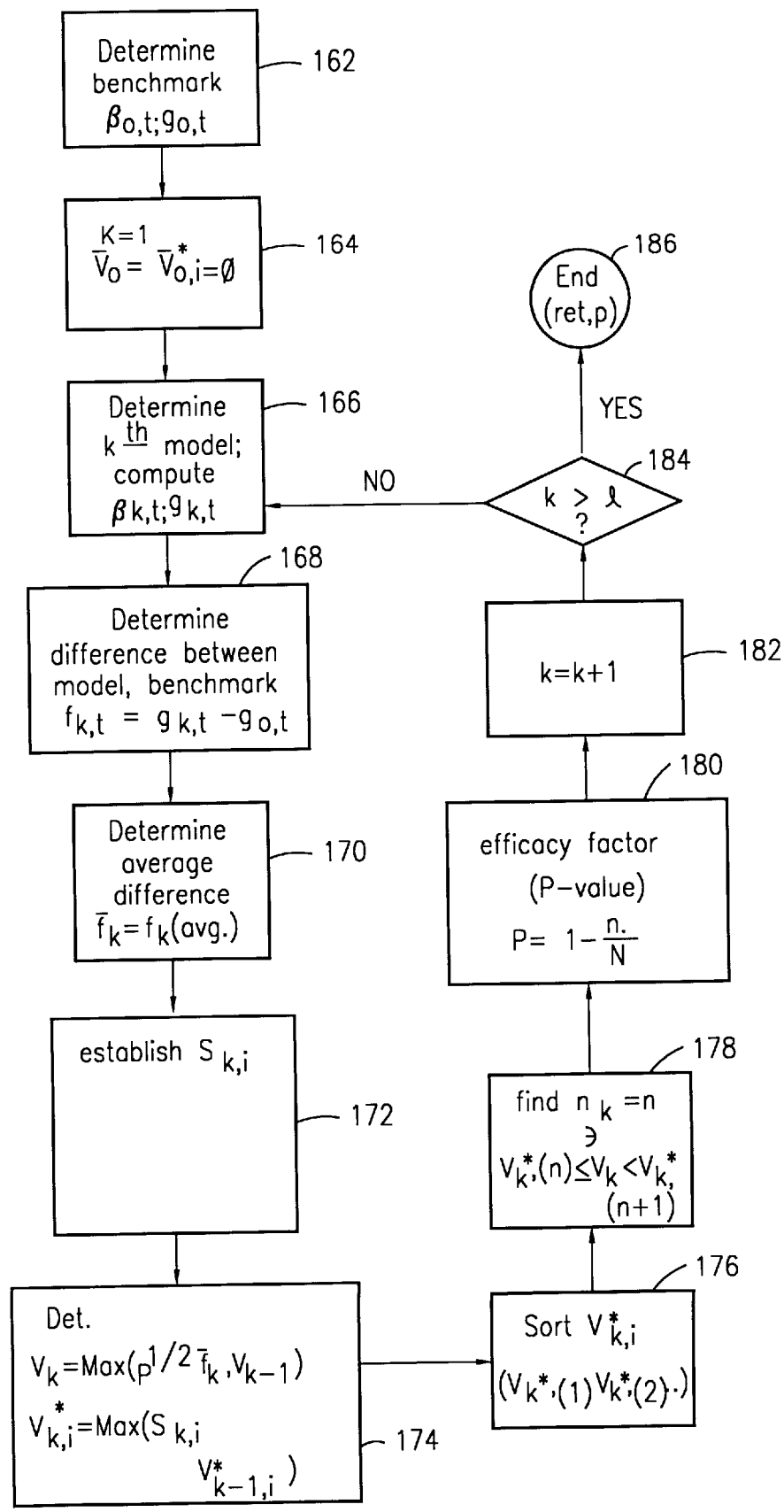
FIG. 8 is a flow chart showing the steps for determining the efficacy value ("p-value") of the best of the comparable entities under test employing a Monte Carlo process that can be used in lieu of the bootstrap logic shown in FIGS. 3 and 6.

More specifically, blocks 162, 164, 166, 168, and 170 of FIG. 8 correspond respectively to blocks 68, 70, 72, 74, and 76 of FIG. 4, with the descriptions of those blocks in FIG. 4 accordingly describing the corresponding blocks in FIG. 8. In block 172 of FIG. 8, an indexed variable $S_{k,i}$ is calculated as follows.

For k=1, 2, . . . ,l, compute row k of matrix $\Omega$ as follows:

$\Omega_{kj} = \gamma_{kj0}$+sum taken over s=1 to T of $\{W_{Ts}(\gamma_{jks}+\gamma_{jks})\}$, j=1, . . . ,k; where $W_{Ts}$, s=1, . . . ,T are given weights; and $\gamma_{jks} = (T-s)^{-1}$ times the sum taken over t=s+1 to T of $\{f_{k,t} f_{k,t-s}\}$ Next, compute row "k" of the Cholesky factorization of $\Omega$:

$C_{jk} = C_{jj}^{-1}\{\Omega_{kj}$–sum taken over l=1 to j−1 of $(C_{jl}C_{kl})\}$, j=1, . . . ,k−1

$C_{kk} = \Omega_{kk}$–sum taken over j=1 to k−1 of $(C_{kj})^2$

Summation terms of the form l=1 to 0 are ignored.

Next, draw $\eta_{ik}$~N(0,1), i=1, . . . ,N (i.e., distributed as standard normal). Then, compute $S_{k,i}$=sum taken over j=1 to k of $\{C_{kj}\eta_{ij}\}$, i=1, . . . ,N. The values $S_{k,i}$, k=1, . . . ,l now fill in the $i^{th}$ "observation matrix", i=1, . . . ,N.

Next moving to block 174, for the $k^{th}$ model under test the maximum primary average difference value $V_k$ is determined using the primary matrix and, for each of the observation matrices, the observation maximum average difference value $V_{k,i}^*$, as follows:

$V_k$=maximum of $P^{1/2}f_k(\text{avg.})$, $V_{k-1}$; and $V_{k,i}^*$=maximum of $S_{k,i}$, $V_{k-1,i}^*$.

Thus, the observation maximum value $V_{k,i}^*$ is a maximum among the prediction models of the $S_{j,i}$, j=1, . . . ,k.

From block 174, the present invention moves to block 176 to sort the observation maximum values $V_{k,i}^*$, from smallest to largest, to generate a sorted list. The sorted values are then denoted $V_{k,(1)}^*, V_{k,(2)}^*, \ldots$. Then, at block 178 the location in the sorted list is determined for the maximum primary average difference value $V_k$. Specifically, an $n_k$ that equals n is determined such that $V_{k,(n)}^* \leq V_k < V_{k,(n+1)}^*$.

Blocks 180, 182, 184, and 186 of FIG. 8 respectively correspond to blocks 86, 88, 90, and 92 of FIG. 4.

Thus, a Monte Carlo simulation can be used to determine the sought-after p-value. To restate the above disclosure, a consistent variance-covariance matrix estimator $\Omega$ is computed. For example, one can use the block resampling estimator of Politis and Romano or the block subsampling estimator of Politis and Romano. Then one samples a large number of times from N(0, $\Omega$) and obtains the desired p-value from the distribution of the extremes of N(0, $\Omega$). This is referred to herein as the "Monte Carlo Reality Check" p-value, in contrast to the bootstrap method previously disclosed, referred to herein as the "Bootstrap Reality Check" p-value.

To appreciate the computations needed for the Monte Carlo approach, consider the addition of one more model (say, model l) to the existing collection. First, compute the new elements of the estimate $\Omega$, its $l^{th}$ row, $\Omega_l = (\Omega_{l1}, \ldots, \Omega_{ll})$. For concreteness, suppose we manipulate $[f_{k, t+T}, k=1, \ldots, l; t=1, \ldots, T]$ to obtain $\Omega_{lk} = \gamma_{lk0}$+sum from s=1 to T of $\{w_{Ts}(\gamma_{kls}+\gamma_{lks})\}$, k=1, . . . ,l where $w_{Ts}$, s=1, . . . , T are suitable weights and $\gamma_{kls} = (T-s)^{-1}$ times the sum from t=s+1 to T of $f_{k, t+T} f_{l, t+T-s}$.

Next, draw independent l×1 random variables $Z_i$~N(0$\Omega$), i=1, . . . , N. For this, compute the Cholesky decomposition of Ω, say C (so CC'=0) and form $Z_i = C \eta_i^l$, where $\eta_i^l$ is l-variate standard normal $(N(0,I_l))$. Finally, compute the Monte Carlo Reality Check p-value from the order statistics of $\zeta_{i,l} = \max_{k=1, \ldots, l} Z_{i,k}$, where $Z_i = (Z_{i1}, \ldots, Z_{il})$.

The computational demands of constructing $\zeta_{i,l}$ are reduced by noting that C is a triangular matrix whose $l^{th}$ row depends only on $\Omega_l$ and the preceding l-1 rows of C. Thus, by storing $\Omega_l$, C, and $(\eta_i^l, \zeta_{i,l})$, i=1, . . . ,N at each stage (l=1,2, . . .), one can construct $\zeta_{i,l}$ at the next stage as $\zeta_{i,l} = \max(\zeta_{i,l-1}, C_l \eta_i^l)$, where $C_l$ is the (1×l) $l^{th}$ row of C, and $\eta_i^l$ is formed recursively as $\eta_i^l = (\eta_i^{l-1}, \eta_{il})'$, with $\eta_{il}$ independently drawn as (scalar) unit normal. Consequently, obtaining the Monte Carlo Reality Check p-value requires storage and manipulation of $f_{k, t+T}$, $\Omega_l$, C, and $(\eta_i^l, \zeta_{i,l})$, i=1, . . . , N.

While the particular SYSTEM AND METHOD FOR TESTING PREDICTION MODELS AND/OR ENTITIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A computer including a data storage device including a computer usable medium having computer usable code means for evaluating the effectiveness of a best of a plurality of comparable entities vis-a-vis a benchmark, the computer usable code means having:

computer readable code means for receiving, from a computer input device, past market data from a database;

computer readable code means for generating the entities to be evaluated, at least one entity outputting at least one indicator of predicted performance;

computer readable code means for generating an effectiveness measurement of the benchmark using at least one predetermined measurement criterion, the predetermined measurement criterion being based on the past market data;

computer readable code means for generating an effectiveness measurement of each entity evaluated using the at least one measurement criterion;

computer readable code means for determining the best one of a plurality of entities;

computer readable code means for generating a statistic representative of the statistical significance of the effectiveness of a best one of the comparable entities vis-á-vis the benchmark using the effectiveness measurements such that the statistic is determined based on the evaluation of all the entities; and based on the statistic, using the best one of the entities to predict future performance.

2. The computer of claim 1, further comprising a primary data matrix including data grouped by data indices, and the computer further comprises computer readable code means for defining a predetermined number of observation data matrices by sampling, with replacement, the primary data matrix, the effectiveness measurements of the models being based on the data.

3. The computer of claim 2, further comprising a predetermined number of observation data matrices, wherein for each data matrix computer readable code means generate effectiveness measurements of the benchmark and the comparable entities, and the computer further comprises:

computer readable code means for generating, for each data matrix, a difference value representative of the difference between the effectiveness measurements of an entity and a benchmark for the respective data matrix.

4. The computer of claim 3, wherein for each matrix the computer readable code means generate an average difference value representing the average difference between the effectiveness measurements of an entity and a benchmark for the respective data matrix.

5. The computer of claim 4, further comprising:

computer readable code means for determining a maximum primary average difference value among the plurality of comparable entities; and computer readable code means for determining an observation maximum average difference value among the plurality of comparable entities as a maximum among the plurality of comparable entities of the difference between the observation average difference value and the primary difference value.

6. The computer of claim 5, further comprising:

computer readable code means for sorting the observation maximum average difference values to generate a sorted list; and computer readable code means for determining a location in the sorted list for the maximum primary average difference value.

7. The computer of claim 6, wherein the location in the sorted list of the maximum primary average difference value is at the nth location in the list, and wherein the statistic representative of the statistical significance of the effectiveness of the best among the comparable entities is the difference between unity and the ratio of n to the total number N of observation matrices.

8. A computer-implemented method for evaluating the effectiveness of the best among plural comparable entities against a benchmark, comprising the acts of:

collecting past performance data in a database;

specifying the comparable entities;

defining a primary matrix arranged using data indices, the primary data matrix including the past performance data;

sampling the primary matrix with replacement N times to define N observation matrices;

filling the matrices with effectiveness measurement criteria, each criterion being representative of a respective data index and a respective entity;

returning a statistic representative of the statistical significance of a most effective entity vis-á-vis a benchmark, based on the matrices;

using the most effective entity to predict future performance.

9. The computer-implemented method of claim 8, further comprising the acts of:

generating an effectiveness measurement of the benchmark using predetermined measurement criteria; and generating an effectiveness measurement of each comparable entity using the measurement criteria, wherein the statistic is based on the effectiveness measurements.

10. The computer-implemented method of claim 9, further comprising the acts of:

generating, for each data matrix, a difference value, the difference value being an average difference value representing the average difference between effectiveness measurements of an entity and a benchmark for the respective data matrix.

11. The computer-implemented method of claim 10, further comprising the acts of:

determining a maximum primary average difference value among the plurality of comparable entities; and determining an observation maximum average difference value among the plurality of comparable entities as a maximum among the plurality of comparable entities of the difference between the observation average difference value and the primary difference value.

12. The computer-implemented method of claim 11, further comprising the acts of:

sorting the observation maximum average difference values to generate a sorted list; and determining a location in the sorted list for the maximum primary average difference value, wherein the location in the sorted list of the maximum primary average difference value is at the nth location in the list, and wherein the statistic representative of the statistical significance of the effectiveness of the best among the comparable entities is the difference between unity and the ratio of n to the total number N of observation matrices.

13. A computer program product comprising:

a computer program storage device readable by a digital processing apparatus; and a program means on the program storage device and including instructions executable by the digital processing apparatus for performing method acts for evaluating plural comparable entities, the method acts comprising:

receiving past performance data from a database, the past performance data being input by means of a computer input device;

generating the entities to be evaluated, the entities outputting one or more indicators of predicted future performance based on the past performance data;

generating an effectiveness measurement of a benchmark using at least one predetermined measurement criterion;

generating an effectiveness measurement of each comparable entity using the measurement criterion;

generating a statistic representative of the statistical significance of the effectiveness of a best one of the comparable entities vis-à-vis the benchmark using the effectiveness measurements such that the statistic is determined based on the evaluation of all the comparable entities;

based on the statistic, determining the best one of a plurality of entities; and using the best one of the entities to predict future performance.

14. The computer program product of claim 13, wherein the method acts further comprise:

grouping data in a primary data matrix by appropriate data indices; and generating a predetermined number of observation matrices by sampling, with replacement from the primary data matrix, the effectiveness measurements of the models being based on the data.

15. The computer program product of claim 14, wherein the method acts further comprise:

generating a predetermined number of observation data matrices;

for each data matrix, generating effectiveness measurements of the benchmark and the comparable entities; and generating, for each data matrix, an average difference value representative of the difference between the effectiveness measurements of an entity and a benchmark for the respective data matrix.

16. The computer program product of claim 15, wherein the method acts further comprise:

determining a maximum primary average difference value among the plurality of comparable entities; and determining an observation maximum average difference value among the plurality of comparable entities as a maximum among the plurality of comparable entities of the difference between the observation average difference value and the primary difference value.

17. The computer program product of claim 16, wherein the method acts further comprise:

sorting the observation maximum average difference values to generate a sorted list; and determining a location in the sorted list for the maximum primary average difference value.

18. The computer program product of claim 17, wherein the location in the sorted list of the maximum primary average difference value is at the $n^{th}$ location in the list, and wherein the statistic is the difference between unity and the ratio of n to the total number N of observation matrices.

* * * * *